UNITED STATES PATENT OFFICE.

NELSON A. CLOSSON, OF BOSTON, MASSACHUSETTS, ASSIGNOR TO THE TROPICAL COCOANUT COMPANY, OF SAME PLACE.

PROCESS OF PREPARING AND PRESERVING COCOANUT.

SPECIFICATION forming part of Letters Patent No. 527,139, dated October 9, 1894.

Application filed July 7, 1894. Serial No. 516,823. (No specimens.)

*To all whom it may concern:*

Be it known that I, NELSON A. CLOSSON, a citizen of the United States, and a resident of Boston, in the county of Suffolk and State of Massachusetts, have invented a new and useful improvement in processes of preparing and preserving cocoanut in its natural state in a condensed form and with its full natural flavor intensified, of which the following is a specification.

I am aware that shredded cocoa nut meat has been mixed with cold or tepid water and then strained under pressure and the liquor thus obtained mixed with cocoa nut milk and then evaporated and sweetened; and also that grated meat of cocoa nut kernels has been dried and then mixed with sugar the process being effected upon heated tables and such methods are not of my invention.

In my process I take any desired quantity of fresh cocoa nut finely ground, grated, or shredded, place it in a kettle, add to it a small quantity of water, usually about ten per cent. of its own weight, apply slow and gentle heat, and when at or near the boiling point, remove from kettle and by mechanical pressure extract the milk, oil, water and other substances from the fiber of the nut as perfectly as possible. I accomplish this extraction by pressure instead of by washing, as it prevents all chance of discoloration or loss of flavor. The proportion of the residuum varies with the juiciness of the nuts, but is usually from forty to forty-five per cent. of their weight. The fiber I keep well stirred and at a moderate heat. The liquid extracted from the mixed cocoa nut and water is then subjected to evaporation in a vacuum pan in order that the aqueous particles may be removed and that what is left may be practically sterilized to prevent decomposition. While this is being done sugar is added in such quantity as may be desired. In my own manufacture I usually add an amount of sugar equal to about twenty-eight per cent. of the original weight of the nuts. The heat at which the liquor will be evaporated will vary, but the product will be satisfactory when the heat is 55° centigrade and the vacuum twenty-eight inches. The fiber, as before stated, has been kept hot, which has the effect of enabling it to take up and readily absorb the liquid originally extracted from it in the condition which the latter has assumed. I do not however use all of the fiber. I take about half of it and add to it all of said liquid. The proportion of fiber and liquid may be somewhat varied, but I have found the above proportion to be the best. The compound thus obtained is rich, full flavored, compact and easily digestible. As the fiber is perfectly white, any slight discoloration which the liquid may have suffered while in the vacuum pan substantially disappears or escapes notice. Cocoa nut thus prepared has body, clear color, and the full natural flavor of the original nuts intensified in a condensed form, and may be kept indefinitely even in very hot climates, especially if well guarded from the air by hermetically sealing or otherwise.

What I claim as my invention, and desire to secure by Letters Patent, is—

The process of preparing cocoa nut which consists in comminuting the meat, adding to the comminuted meat about ten per cent. of its weight of water, heating the mixture slowly and gently, extracting the soluble matter from the fiber by pressure, maintaining the heat of fiber thus separated and stirring the same, simultaneously evaporating the extracted matter in a partial vacuum, adding sugar during said evaporation and finally combining with said evaporated extract about one half of said fiber, both the extract and the fiber being kept hot and the latter well stirred during the operation, substantially as set forth.

N. A. CLOSSON.

Witnesses:
CHAS. H. DREW,
CLOVIS N. BACON.